United States Patent
Duan

(10) Patent No.: US 10,631,132 B2
(45) Date of Patent: Apr. 21, 2020

(54) POSITIONING METHOD AND DEVICE

(71) Applicant: DATANG MOBILE COMMUNICATIONS EQUIPMENT CO.,LTD., Beijing (CN)

(72) Inventor: Jianghai Duan, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 16/094,207

(22) PCT Filed: Feb. 22, 2017

(86) PCT No.: PCT/CN2017/074421
§ 371 (c)(1),
(2) Date: Oct. 17, 2018

(87) PCT Pub. No.: WO2017/206553
PCT Pub. Date: Dec. 7, 2017

(65) Prior Publication Data
US 2019/0098449 A1    Mar. 28, 2019

(30) Foreign Application Priority Data
May 31, 2016   (CN) .......................... 2016 1 0378357

(51) Int. Cl.
*H04W 4/029*   (2018.01)
*G01S 5/02*   (2010.01)

(52) U.S. Cl.
CPC ........... *H04W 4/029* (2018.02); *G01S 5/0252* (2013.01)

(58) Field of Classification Search
CPC ....... H04W 4/023; H04W 4/33; H04W 4/029; H04W 4/02
USPC ....................................................... 455/456.1
See application file for complete search history.

(56) References Cited

U.S. PATENT DOCUMENTS

| | | | |
|---|---|---|---|
| 2007/0049286 A1 | 3/2007 | Kim et al. | |
| 2011/0138035 A1 | 6/2011 | Dahl | |
| 2015/0215731 A1 | 7/2015 | Chen et al. | |
| 2016/0245896 A1* | 8/2016 | Cui | ........................ H04W 64/00 |
| 2016/0353236 A1* | 12/2016 | Cho | ........................ H04W 4/02 |

FOREIGN PATENT DOCUMENTS

| | | |
|---|---|---|
| CN | 1255812 A | 6/2000 |
| CN | 1622650 A | 6/2005 |
| CN | 1920593 A | 2/2007 |

(Continued)

*Primary Examiner* — Anthony S Addy
*Assistant Examiner* — Farid Seyedvosoghi
(74) *Attorney, Agent, or Firm* — Kilpatrick Townsend & Stockton, LLP

(57) ABSTRACT

Disclosed are a positioning method and device for improving precision of positioning. The method comprises: acquiring an electrical signal vector in a current location of a UE device, and determining a current base station of the UE device; determining multiple mesh areas corresponding to a coverage area of the base station; and determining the current location of the UE device according to a distance between the electrical signal vector in the current location of the UE device and an electrical signal vector in each of the mesh areas and a preset reference distance corresponding to the base station.

10 Claims, 1 Drawing Sheet

(56) References Cited

FOREIGN PATENT DOCUMENTS

| | | | |
|---|---|---|---|
| CN | 102170697 A | 8/2011 | |
| CN | 103402258 A | 11/2013 | |
| CN | 103777175 A | 5/2014 | |
| CN | 104965193 A | 10/2015 | |
| EP | 2998760 A1 * | 3/2016 | ........... G01S 5/0252 |
| EP | 2998760 A1 | 3/2016 | |

* cited by examiner

POSITIONING METHOD AND DEVICE

CROSS REFERENCE

This application is a US National Stage of International Application No. PCT/CN2017/074421, filed Feb. 22, 2017, designating the United States, and claiming the benefit and priority of Chinese Patent Application No. 201610378357.2, filed with the Chinese Patent Office on May 31, 2015, and entitled "A locating method and apparatus". The entire disclosure of the application above is incorporated herein by reference.

FIELD

The present disclosure relates to the field of communications, and particularly to a locating method and apparatus.

BACKGROUND

As data services and multimedia services grow rapidly, demands for locating and navigation, particularly in complicated indoor environments, increase as well. Statistical results show that on average, people spend 80% to 90% of their daily hours indoors, mobile phones operate indoors for 70% of their service time, and data connections are active indoors for 80% of their service time. It is always necessary to determine positional information of a mobile terminal or its holder in an environment such as an airport, an exhibition hall, a warehouse, a supermarket, a library, an underground parking lot or a mine. Further, indoor locating technologies provide a promising market prospect of commercial locating services including emergency call service, business help phone service, personal inquiry service, vehicle navigation service, specific tracking service and etc. The indoor locating technologies is being studied by researchers all over the world, such as cellular networks, wireless local area networks, Bluetooth, ultra-wideband, or image analyzing, are proposed. Radio Frequency Pattern Matching (RFPM) is a commonly used indoor locating solution.

RFPM considers electrical signal characteristics of a User Equipment (UE) at a certain position as unchanged, therefore, some electrical signal information related to a position can be used as "positional fingerprint" information of the position. A UE is located by measuring electrical signal information of the UE and comparing the electrical signal information of the UE with a "positional fingerprint" in a database to determine the current position of the UE. In RFPM, the position of the UE is recognized by using the database storing electrical signal characteristics of different positions. The locating process of the RFPM generally includes two stages: an offline sampling stage and an online locating stage.

In the offline sampling stage, firstly a coverage area of a radio network is divided into a plurality of grids. Then a fingerprint database is created for each grid, that is, electrical signal characteristics of surrounding base stations, e.g., RSRP of a Long Term Evolution (LTE) system, are stored in the fingerprint database. Grid characteristics stored in the database are obtained by measurement of path loss. Measurements obtained in the offline sampling stage are stored in the fingerprint database to support a matching algorithm performed in the online locating stage.

In the online locating stage, a real-time electrical signal characteristic of the current position of the UE is measured, then a piece of data matches the measured electrical signal characteristic best is found in the fingerprint database by using the matching algorithm, and the position of the UE is determined, where the position of the grid having a characteristic most similar to the measured electrical signal characteristic is determined as the position of the UE.

Precision of locating is significantly affected by the granularity at which the coverage area of the radio network is divided into grids. If the coverage area is divided into grids at a coarser granularity, then the precision of locating is lower. If the coverage area is divided into grids at a finer granularity, then locating requires more computations, longer response time, and a higher processing capacity of a backend database. In practical use, e.g., in indoor scenarios such as shopping malls and airports, different local areas require different precision of locating, so different local areas of an entire coverage area are often required to be divided into grids at different granularities. On the other hand, even if different local areas of an entire coverage area are divided into grids at a same granularity, precision of fingerprint recognitions of grids at different local areas might be different due to reasons such as radio transmission.

In the conventional RFPM indoor locating method, the difference in recognition precision or in confidence among grids in positional fingerprint matching is not taken into account during online locating (i.e., fingerprint matching) computation, thus degrading the precision of locating.

SUMMARY

Embodiments of the disclosure provide a locating method and apparatus so as to improve the precision of locating.

An embodiment of the disclosure provides a locating method. The method includes: obtaining an electrical signal vector of a current position of a UE, and determining a base station currently serving the UE; determining grids corresponding to a coverage area of the base station and, determining the current position of the UE according to distances between the electrical signal vector of the current position of the LT and a preset electrical signal vector of each of the grids, and according to a preset reference distance corresponding to the base station.

In an embodiment, determining the current position of the UE according to the distances between the electrical signal vector of the current position of the UE and the preset electrical signal vector of each of the grids; and according to the preset reference distance corresponding to the base station, includes: for each of the grids, determining the distance between the electrical signal vector of the current position of the UE and the preset electrical signal vector of the grid as a first reference distance corresponding to the grid; and, determining the current position of the UE according to first reference distances corresponding to each of the grids and the preset reference distance corresponding to the base station.

In an embodiment, the reference distance corresponding to the base station is determined by: determining distances between electrical signal vectors of adjacent grids corresponding to the coverage area of the base station according to the pre-obtained electrical signal vectors of the respective grids corresponding to the coverage area of the base station; for each of the grids corresponding to the coverage area of the base station, selecting a largest distance of the determined distances between the electrical signal vectors of respective grids adjacent to the grid and the electrical signal vector of the grid, and determining the largest distance as a second reference distance corresponding to the grid; and selecting a largest one of the second reference distances corresponding to the respective grids corresponding to the coverage area of the base station, and determining the largest second reference distance as the reference distance corresponding to the base station.

In an embodiment, determining the current position of the UE according to the first reference distances corresponding to each of the grids and the preset reference distance corresponding to the base station includes: forming a first set of the first reference distances corresponding to the respective grids; determining in the first set a quantity K of first reference distances shorter than or equal to the reference distance corresponding to the base station; and when K is 0, determining positional coordinates of a grid corresponding to a shortest first reference distance in the first set as the current position of the UE; or, when K is not 0, forming a second set of the first reference distances shorter than or equal to the reference distance corresponding to the base station in the first set and determining the current position of the UE according to the second set.

In an embodiment, determining the current position of the LIE according to the second set includes: sorting all of the first reference distances in the second set in an ascending order; and when a first reference distance in a first position after sorting is shorter than or equal to the second reference distance corresponding to the grid corresponding to the first reference distance in the first position, determining positional coordinates of the grid corresponding to the first reference distance in the first position as the current position of the UE; or, when the first reference distance in the first position after sorting is longer than the second reference distance corresponding to the grid corresponding to the first reference distance in the first position, determining in sequence whether a first reference distance in a next position in the sorted second set is shorter than or equal to the second reference distance corresponding to the grid corresponding to the first reference distance in the next position; and when a first reference distance in an n-th position in the sorted second set is shorter than or equal to the second reference distance corresponding to the grid corresponding to the first reference distance in the n-th position; determining current positional coordinates of the UE by weighting positional coordinates of the grids corresponding to the first reference distances from the first position to the n-th position according to the first reference distances from the first position to the n-th position, and determining the current positional coordinates of the UE as the current position of the UE, where n is a positive integer more than or equal to 2.

In an embodiment, determining the current positional coordinates of the UE by weighting the positional coordinates of the grids corresponding to the first reference distances from the first position to the n-th position according to the first reference distances from the first position to the n-th position includes: determining an abscissa value x and an ordinate value y of the current position of the UE according to the positional coordinates of the grids corresponding to the first reference distances from the first position to the n-th position; and according to the first reference distances from the first position to the n-th position, by using equations of:

$$x = x_{m_1} * \frac{L_{i,t,m_1}}{L_{i,t,m_1} + L + L_{i,t,m_n}} + L\ x_{m_n} * \frac{L_{i,t,m_n}}{L_{i,t,m_1} + L + L_{i,t,m_n}}, \text{ and}$$

$$y = y_{m_1} * \frac{L_{i,t,m_1}}{L_{i,t,m_1} + L + L_{i,t,m_n}} + L\ y_{m_n} * \frac{L_{i,t,m_n}}{L_{i,t,m_1} + L + L_{i,t,m_n}},$$

$x_{m_1}$ represents an abscissa value of the position of the grid corresponding to the first reference distance in the first position in the sorted second set, and $y_{m_1}$ represents the ordinate value of the position of the grid corresponding to the first reference distance in the first position in the sorted second set; $x_{m_n}$ represents an abscissa value of the position of the grid corresponding to the first reference distance in the n-th position in the sorted second set, and $y_{m_n}$ represents an ordinate value of the position of the grid corresponding to the first reference distance in the n-th position in the sorted second set; $L_{i,t,m_1}$ represents the first reference distance in the first position in the sorted second set, a subscript i corresponds to an index of the base station, and t represents a current time; and $L_{i,t,m_n}$ represents the n-th first reference distance in the sorted second set.

In an embodiment, the method further includes: when each first reference distance in the sorted second set is longer than the second reference distance corresponding to the grid corresponding to the first reference distance, determining the current position of the UE by determining the positional coordinates of the grid corresponding to the first reference distance in the first position in the sorted set as the current position of the UE.

An embodiment of the disclosure provides a locating apparatus. The apparatus includes a memory and a processor. The memory stores one or more instructions. The processor is configured to execute the one or more instructions to: obtain an electrical signal vector of a current position of a UE; determine a base station currently serving the UE; determine a plurality of grids corresponding to a coverage area of the base station; and determine the current position of the UE according to distances between the electrical signal vector of the current position of the UE and a preset electrical signal vector of each of the grids, and according to a preset reference distance corresponding to the base station.

In an embodiment, the processor is further configured to execute the one or more instructions to: for each of the grids, determine the distance between the electrical signal vector of the current position of the UE and the preset electrical signal vector of the grid as a first reference distance corresponding to the grid; and determine the current position of the UE according to first reference distances corresponding to each of the grids and the preset reference distance corresponding to the base station.

In an embodiment, the processor is further configured to execute the one or more instructions to: preset the reference distance corresponding to the base station by: determining distances between electrical signal vectors of adjacent grids corresponding to the coverage area of the base station according to the pre-obtained electrical signal vectors of the respective grids corresponding to the coverage area of the base station; for each of the grids corresponding to the coverage area of the base station, selecting a largest distance of the determined distances between the electrical signal vectors of respective grids adjacent to the grid and the electrical signal vector of the grid, and determining the largest distance as a second reference distance corresponding to the grid; selecting a largest one of the second reference distances corresponding to the respective grids corresponding to the coverage area of the base station; and determining the largest second reference distance as the reference distance corresponding to the base station.

In an embodiment, when the processor is further configured to execute the one or more instructions to: form a first set of the first reference distances corresponding to the respective grids; determine in the first set a quantity K of first reference distances shorter than or equal to the reference distance corresponding to the base station; and when K is 0, determine positional coordinates of a grid corresponding to a shortest first reference distance in the first set as the current position of the UE; or, when K is not 0, form a second set of the first reference distances shorter than or equal to the reference distance corresponding to the base station in the first set and determining the current position of the UE according to the second set.

In an embodiment, when the processor is further configured to execute the one or more instructions to: sort all of the first reference distances in the second set in an ascending order; and when a first reference distance in a first position after sorting is shorter than or equal to the second reference distance corresponding to the grid corresponding to the first reference distance in the first position, determine positional coordinates of the grid corresponding to the first reference distance in the first position as the current position of the UE; or, when the first reference distance in the first position after sorting is longer than the second reference distance corresponding to the grid corresponding to the first reference distance in the first position, determine in sequence whether a first reference distance in a next position in the sorted second set is shorter than or equal to the second reference distance corresponding to the grid corresponding to the first reference distance in the next position, and when a first reference distance in an n-th position in the sorted second set is shorter than or equal to the second reference distance corresponding to the grid corresponding to the first reference distance in the n-th position, determine current positional coordinates of the UE by weighting positional coordinates of the grids corresponding to the first reference distances from the first position to the n-th position according to the first reference distances from the first position to the n-th position, and determine the current positional coordinates of the UE as the current position of the UE, where n is a positive integer more than or equal to 2.

In an embodiment, when the processor is further configured to execute the one or more instructions to: determine an abscissa value x and an ordinate value y of the current position of the UE according to the positional coordinates of the grids corresponding to the first reference distances from the first position to the n-th position, and according to the first reference distances from the first position to the n-th position, by using equations of:

$$x = x_{m_1} * \frac{L_{i,t,m_1}}{L_{i,t,m_1} + L + L_{i,t,m_n}} + L\ x_{m_n} * \frac{L_{i,t,m_n}}{L_{i,t,m_1} + L + L_{i,t,m_n}}, \text{ and}$$

$$y = y_{m_1} * \frac{L_{i,t,m_1}}{L_{i,t,m_1} + L + L_{i,t,m_n}} + L\ y_{m_n} * \frac{L_{i,t,m_n}}{L_{i,t,m_1} + L + L_{i,t,m_n}},$$

$x_{m_1}$ represents an abscissa value of the position of the grid corresponding to the first reference distance in the first position in the sorted second set, and $y_{m_1}$ represents the ordinate value of the position of the grid corresponding to the first reference distance in the first position in the sorted second set: $x_{m_n}$ represents an abscissa value of the position of the grid corresponding to the first reference distance in the n-th position in the sorted second set, and $y_{m_n}$ represents an ordinate value of the position of the grid corresponding to the first reference distance in the n-th position in the sorted second set; $L_{i,t,m_1}$ represents the first reference distance in the first position in the sorted second set, a subscript i corresponds to an index of the base station, and t represents a current time; and $L_{i,t,m_n}$ represents the n-th first reference distance in the sorted second set.

In an embodiment, the processor is further configured to execute the one or more instructions to: when each first reference distance in the sorted second set is longer than the second reference distance corresponding to the grid corresponding to the first reference distance, determine the current position of the UE by determining the positional coordinates of the grid corresponding to the first reference distance in the first position in the sorted set as the current position of the UE.

DETAILED DESCRIPTION OF THE EMBODIMENTS

Embodiments of the disclosure provide a locating method and apparatus so as to improve the precision of locating.

In the embodiments of the disclosure, an area where a UE is to be located is divided into N grids in advance. The entire area is covered by at least one base station (or cell), and N is a positive integer. That is, the entire area can be covered by one or more base stations. Suppose that the entire area is covered by M base stations and M is a positive integer. The quantities of grids corresponding to coverage areas of the M base stations are $N_1$, $N_2$, . . . , $N_M$, respectively. $N=N_1+N_2+ \ldots +N_M$. Different local areas can be divided into grids at different granularities. For example, a coverage area of a different base station is divided into grids at a different granularity, where a coverage area requiring higher precision of locating is divided into grids at a finer granularity, and a coverage area requiring lower precision of locating is divided into grids at a coarser granularity.

Figure 1:
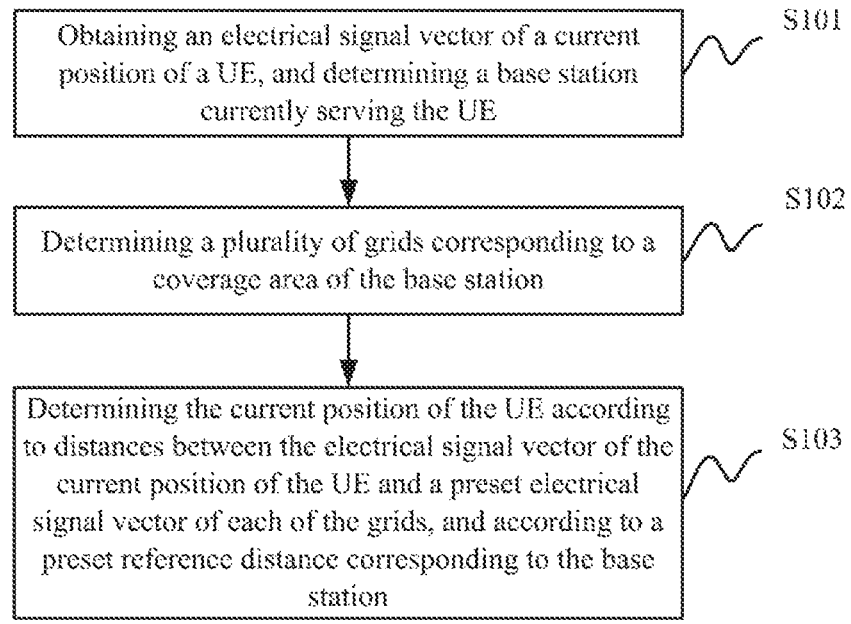
FIG. 1 is a schematic flow chart of a locating method according to an embodiment of the disclosure.

As illustrated by FIG. 1, a locating method according to an embodiment of the disclosure includes the following operations S101-S103.

Operation S101: obtaining an electrical signal vector of a current position of a UE, and determining a base station currently serving the UE.

Herein suppose an index of the base station currently serving the UE is i. The electrical signal vector can be signal power such as Reference Signal Received Power (RSRP), signal strength, a time of arrival, an angle of arrival, and etc.

Operation S102: determining grids corresponding to a coverage area of the base station.

The grids are grids into which the coverage area is divided in advance in the offline sampling stage, that is, a range of grids to perform "fingerprint matching" computation is determined according to the base station i currently serving the UE. The grids corresponding to the base station i correspond to the coverage area of the base station. The grids corresponding to the coverage area of the base station i can be represented as {1, 2, 3, . . . , $N_i$}, where 1, 2, . . . , $N_i$ represent indexes of the grids, respectively.

Operation S103: determining the current position of the UE according to distances between the electrical signal vector of the current position of the UE and a preset electrical signal vector of each of the grids, and according to a preset reference distance corresponding to the base station.

Here each of the grids is each of the grids corresponding to the coverage area of the base station currently serving the UE. The preset electrical signal vector of each of the grids is an electrical signal vector of each grid obtained in the offline sampling stage. And the preset reference distance corresponding to the base station is determined in the offline sampling stage.

The operations S101 to S103 can be performed by a locating server, for example.

In an embodiment, the operation S103 includes: for each of the grids, determining the distance between the electrical signal vector of the current position of the UE and the preset electrical signal vector of the grid as a first reference distance corresponding to the grid; and determining the current position of the UE according to first reference distances corresponding to each of the grids and the preset reference distance corresponding to the base station.

In an embodiment, the reference distance corresponding to the base station is determined by operations A, B and C.

Operation A: determining distances between electrical signal vectors of adjacent grids corresponding to the coverage area of the base station according to the pre-obtained electrical signal vectors of the respective grids corresponding to the coverage area of the base station.

Operation B: for each of the grids corresponding to the coverage area of the base station, selecting a largest distance of the determined distances between the electrical signal vectors of respective grids adjacent to the grid and the electrical signal vector of the grid, and determining the largest distance as a second reference distance corresponding to the grid.

Operation C: selecting a largest one of the second reference distances corresponding to the respective grids corresponding to the coverage area of the base station, and determining the largest second reference distance as the reference distance corresponding to the base station.

In an embodiment, the reference distance corresponding to the base station is determined in the offline sampling stage, that is, both the reference distance corresponding to the base station, and the second reference distances corresponding to the grids are predetermined in the offline sampling stage. Operations S101 to S103 are performed in the online locating stage.

Operations performed in the offline sampling stage are described below in brief.

The first operation: dividing an entire area where the UE is to be located into N grids. The entire area is covered by at least one base station (or cell), and N is a positive integer. Stated otherwise, the entire area can be covered by one or more base stations. Suppose the entire area is covered by M base stations and M is a positive integer. The quantities of grids corresponding to coverage areas of the respective base stations are $N_1, N_2, \ldots, N_M$, respectively, where $N=N_1+N_2+\ldots+N_M$. Different local areas can be divided into grids at different granularities. For example, a coverage area of a different base station is divided into grids at a different granularity.

The second operation: sampling an electrical signal vector of each grid.

The third operation: recording and storing a correspondence relationship between each grid and the base station, positional information of each grid, the electrical signal vector of each grid, and etc.

In an embodiment, each of the M base stations and the different grids are indexed, correspondence relationships between the indexes of the base stations and the indexes of the grids are recorded, and the positional information of each grid can include positional coordinates (e.g., an abscissa value x and an ordinate value y) of the grid.

The fourth operation: for grids corresponding to each base station: (1) calculating distances between electrical signal vectors of adjacent grids corresponding to the coverage area of the base station; (2) for each of the grids corresponding to the base station, selecting a largest distance of the calculated distances between the electrical signal vectors of respective grids adjacent to the grid and the electrical signal vector of the grid, and determining the largest distance as a second reference distance corresponding to the grid; and (3) selecting a largest one of the second reference distances corresponding to the respective grids corresponding to the base station, and determining the largest second reference distance as the reference distance corresponding to the base station.

Operation 5: storing the calculated distances between the electrical signal vectors of the adjacent grids, the reference distance corresponding to each grid, and the reference distance corresponding to each base station in a database. Table 1 depicts a part of information stored in the database.

In Table 1, distances between electrical signal vectors of grids are represented as matrixes. In this embodiment, only the distances between the electrical signal vectors of the adjacent grids are calculated, the distances between the electrical signal vectors of grids not adjacent to each other are set to 0, and the distances between each electrical signal vector and the electrical signal vector itself are also set to 0 as denoted by elements on primary diagonals of the distance matrixes in Table 1.

TABLE 1

| Base Station (or Cell) Index | Grid Index | Matrix of Distances between Electrical Signal Vectors of Grids | Reference Distance corresponding to a Grid | Reference Distance corresponding to a Base Station or cell |
|---|---|---|---|---|
| base station 1 (or cell 1) | 1<br>2<br>...<br>$N_1$ | $\begin{array}{c} \phantom{Grid 1} \\ \text{Grid 1} \\ \text{Grid 2} \\ \text{Grid 3} \\ \vdots \\ \vdots \\ \text{Grid } N_1 \end{array} \begin{array}{c} \text{Grid 1} \quad \text{Grid 2} \quad \text{Grid 3} \ldots \quad \ldots \quad \text{Grid } N_1 \\ \left[ \begin{array}{cccccc} 0 & L_{1,1,2} & L_{1,1,3} & \ldots & \ldots & L_{1,1,N_1} \\ L_{1,2,1} & 0 & L_{1,2,3} & \ldots & \ldots & L_{1,2,N_1} \\ L_{1,3,1} & L_{1,3,2} & 0 & \ldots & \ldots & L_{1,3,N_1} \\ \vdots & \vdots & \vdots & \ddots & & \vdots \\ \vdots & \vdots & \vdots & & \ddots & \vdots \\ L_{1,N_1,1} & L_{1,N_1,2} & L_{1,N_1,3} & \ldots & \ldots & 0 \end{array} \right] \end{array}$ | $L_{1,1} = \max_{j \in \{1,2,LN_1\}}\{L_{1,j,1}\}$<br>$L_{1,2} = \max_{j \in \{1,2,LN_1\}}\{L_{1,j,2}\}$<br>...<br>$L_{1,N_1} = \max_{j \in \{1,2,LN_1\}}\{L_{1,j,N_1}\}$ | $L_1 = \max_{j \in \{1,2,LN_1\}}\{L_{1,j}\}$ |

TABLE 1-continued

| Base Station (or Cell) Index | Grid Index | Matrix of Distances between Electrical Signal Vectors of Grids | Reference Distance corresponding to a Grid | Reference Distance corresponding to a Base Station or cell |
|---|---|---|---|---|
| base station 2 (or cell 2) | 1, 2, ..., $N_2$ | $\begin{array}{c} \phantom{Grid1} \quad \text{Grid1} \quad \text{Grid2} \quad \text{Grid3} \quad \ldots \quad \ldots \quad \text{Grid}N_2 \\ \text{Grid1} \\ \text{Grid2} \\ \text{Grid3} \\ \vdots \\ \vdots \\ (\text{Grid}N)_2 \end{array} \begin{bmatrix} 0 & L_{1,1,2} & L_{1,1,3} & \ldots & \ldots & L_{1,1,N_2} \\ L_{1,2,1} & 0 & L_{1,2,3} & \ldots & \ldots & L_{1,2,N_2} \\ L_{1,3,1} & L_{1,3,2} & 0 & \ldots & \ldots & L_{1,3,N_2} \\ \vdots & \vdots & \vdots & \ddots & & \vdots \\ \vdots & \vdots & \vdots & & \ddots & \vdots \\ L_{1,N_2,1} & L_{1,N_2,2} & L_{1,N_2,3} & \ldots & \ldots & 0 \end{bmatrix}$ | $L_{2,1} = \max_{j \in \{1,2,LN_2\}}\{L_{2,j,1}\}$<br>$L_{2,2} = \max_{j \in \{1,2,LN_2\}}\{L_{2,j,2}\}$<br>...<br>$L_{2,N_2} = \max_{j \in \{1,2,LN_2\}}\{L_{2,j,N_2}\}$ | $L_2 = \max_{j \in \{1,2,LN_2\}}\{L_{2,j}\}$ |
| base station M (or cell M) | 1, 2, ..., $N_M$ | $\begin{array}{c} \phantom{Grid1} \quad \text{Grid 1} \quad \text{Grid 2} \quad \text{Grid 3} \quad \ldots \quad \ldots \quad \text{Grid } N_2 \\ \text{Grid 1} \\ \text{Grid 2} \\ \text{Grid 3} \\ \vdots \\ \vdots \\ \text{Grid } N_M \end{array} \begin{bmatrix} 0 & L_{1,1,2} & L_{1,1,3} & \ldots & \ldots & L_{1,1,N_M} \\ L_{1,2,1} & 0 & L_{1,2,3} & \ldots & \ldots & L_{1,2,N_M} \\ L_{1,3,1} & L_{1,3,2} & 0 & \ldots & \ldots & L_{1,3,N_M} \\ \vdots & \vdots & \vdots & \ddots & & \vdots \\ \vdots & \vdots & \vdots & & \ddots & \vdots \\ L_{1,N_M,1} & L_{1,N_M,2} & L_{1,N_M,3} & \ldots & \ldots & 0 \end{bmatrix}$ | $L_{M,1} = \max_{j \in \{1,2,LN_M\}}\{L_{M,j,1}\}$<br>$L_{M,2} = \max_{j \in \{1,2,LN_M\}}\{L_{M,j,2}\}$<br>...<br>$L_{M,N_M} = \max_{j \in \{1,2,LN_M\}}\{L_{M,j,N_M}\}$ | $L_M = \max_{j \in \{1,2,LN_M\}}\{L_{M,j}\}$ |

In Table 1, $L_i$ represents a reference distance corresponding to a base station (or cell) i, where i is the index of the base station (or cell), For example, $L_1$ represents a reference distance corresponding to a base station (or cell) 1, $L_2$ represents a reference distance corresponding to a base station (or cell) 2, $L_M$ represents a reference distance corresponding to a base station (or cell) M, and etc. $L_{1,j}$ represents a reference distance corresponding to a grid j (i.e., a grid whose index is j) among grids corresponding to the base station (or cell) i. For example, $L_{1,1}$ represents a reference distance corresponding to a grid 1 among grids corresponding to the base station (or cell) 1, $L_{M,3}$ represents a reference distance corresponding to a grid 3 among grids corresponding to the base station (or cell) M, and etc, $L_{i,j,k}$ represents the distance between an electrical signal vector of the grid j, and an electrical signal vector of a grid k, among the grids corresponding to the base station (or cell) i. For example, $L_{1,1,2}$ represents the distance between an electrical signal vector of the grid 1, and an electrical signal vector of a grid 2, among the grids corresponding to the base station (or cell) 1. $L_{M,3,2}$ represents the distance between an electrical signal vector of the grid 3, and an electrical signal vector of the grid 2, among the grids corresponding to the base station (or cell) M, and etc.

Here the distances between the electrical signal vectors of the grids can be calculated by Euclidean or Manhattan distances. The embodiments of the disclosure do not make limitations to the method for calculating the distances between the electrical signal vectors of the grids.

The online locating process is described below.

In an embodiment, determining the current position of the UE according to the first reference distances corresponding to each of the grids and the preset reference distance corresponding to the base station includes: the following operations I to IIII.

Operation I: forming a first set of the first reference distances corresponding to the respective grids.

If current time is represented as t, then the first set of the first reference distances corresponding to the respective grids corresponding to the coverage area of the base station i may be represented as $\{L_{i,t,1}, L_{i,t,2}, L_{i,t,3}, \ldots, L_{i,t,N_i}\}$. In the first set, for example, $L_{i,t,1}$ represents a first reference distance corresponding to a grid whose index is I (represented as a grid 1) among the grids corresponding to the coverage area of the base station i at time t, $L_{i,t,N_i}$ represents a first reference distance corresponding to a grid having an index of $N_i$ (represented as a grid $N_i$) among the grids corresponding to the coverage area of the base station i at time t, and etc.

Operation II: determining in the first set a quantity K of first reference distances shorter than or equal to the reference distance corresponding to the base station.

Operation III: when K is 0, determining positional coordinates of a grid corresponding to a shortest first reference distance in the first set as the current position of the UE.

K is 0, means that, all the first reference distances in the first set are longer than the reference distance corresponding to the base station.

Operation IIII: When K is not 0, forming a second set of the first reference distances shorter than or equal to the reference distance corresponding to the base station in the first set and determining the current position of the UE according to the second set.

In an embodiment, determining the current position of the UE according to the second set includes: sorting all of the first reference distances in the second set in an ascending order; and when a first reference distance in a first position after sorting is shorter than or equal to the second reference distance corresponding to the grid corresponding to the first reference distance in the first position, determining positional coordinates of the grid corresponding to the first reference distance in the first position as the current position of the UE; or when the first reference distance in the first position after sorting is longer than the second reference distance corresponding to the grid corresponding to the first reference distance in the first position, determining in sequence whether a first reference distance in a next position in the sorted second set is shorter than or equal to the second reference distance corresponding to the grid corresponding to the first reference distance in the next position, and when a first reference distance in an n-th position in the sorted second set is shorter than or equal to the second reference distance corresponding to the grid corresponding to the first reference distance in the n-th position, determining current positional coordinates of the UE by weighting positional coordinates of the grids corresponding to the first reference distances from the first position to the n-th position according to the first reference distances from the first position to the n-th position, and determining the current positional coordinates of the UE as the current position of the UE, where n is a positive integer more than or equal to 2.

In other words, when the first reference distance in the first position in the sorted second set is longer than the second reference distance corresponding to the grid corresponding to the first reference distance in the first position, if it is determined that the first reference distance in the second position in the sorted second set is shorter than or equal to the second reference distance corresponding to the grid corresponding to the first reference distance in the second position, then instead of determining whether the first reference distance in the third position in the sorted second set is shorter than or equal to the second reference distance corresponding to the grid corresponding to the first reference distance in the third position, current positional coordinates of the UE is determined directly by weighting positional coordinates of the grids corresponding to the first reference distances in the first and second positions in the sorted second set, respectively. If the first reference distance in the second position in the sorted second set is also longer than the second reference distance corresponding to the grid corresponding to the first reference distance in the second position, then subsequent determination is made.

In order to be distinguished from the denotations of the first reference distances in the first set, the sorted second set is represented as $\{L_{i,t,m_1}, L_{i,t,m_2}, L_{i,t,m_3}, \ldots, L_{i,t,m_K}\}$, where the first reference distance in the first position in the sorted second set is represented as $L_{i,t,m_1}$, the first reference distance in the second position is represented as $L_{i,t,m_2}, \ldots$, the first reference distance in the K-th position is represented as $L_{i,t,m_K}$. For example, the quantity K of first reference distances, shorter than or equal to the reference distance corresponding to the base station, in the first set is 4, and the first reference distances, shorter than or equal to the reference distance corresponding to the base station, in the first set are represented respectively as $L_{i,t,1}, L_{i,t,4}, L_{i,t,5}, L_{i,t,13}$, then the second set can be represented as $\{L_{i,t,1}, L_{i,t,4}, L_{i,t,5}, L_{i,t,13}\}$. The elements (i.e., the first reference distances) in the second set are sorted in an ascending order. Suppose the sorted second set is represented as $\{L_{i,t,1}, L_{i,t,5}, L_{i,t,13}, L_{i,t,4}\}$, then the first reference distance in the first position, $L_{i,t,1}$, in the sorted second set can be represented as $L_{i,t,m_1}$, the first reference distance in the second position, $L_{i,t,5}$, in the sorted second set can be represented as $L_{i,t,m_2}, \ldots$, and the first reference distance in the fourth position, $L_{i,t,4}$, in the sorted second set can be represented as $L_{i,t,m_4}$. Stated otherwise, the subscripts $m_1, m_2, \ldots, m_n$ represent indexes of the first reference distances in the sorted second set instead of the preset indexes of the grids.

In an embodiment, determining the current positional coordinates of the UE by weighting the positional coordinates of the grids corresponding to the first reference distances from the first position to the n-th position according to the first reference distances from the first position to the n-th position includes: determining an abscissa value x and an ordinate value y of the current position of the UE according to the positional coordinates of the grids corresponding to the first reference distances from the first position to the n-th position, and according to the first reference distances from the first position to the n-th position, by using the following equations [1] and [2]:

$$x = x_{m_1} * \frac{L_{i,t,m_1}}{L_{i,t,m_1} + L + L_{i,t,m_n}} + L\ x_{m_n} * \frac{L_{i,t,m_n}}{L_{i,t,m_1} + L + L_{i,t,m_n}}, \text{and} \quad [1]$$

$$y = y_{m_1} * \frac{L_{i,t,m_1}}{L_{i,t,m_1} + L + L_{i,t,m_n}} + L\ y_{m_n} * \frac{L_{i,t,m_n}}{L_{i,t,m_1} + L + L_{i,t,m_n}}. \quad [2]$$

$x_{m_1}$ represents an abscissa value of the position of the grid corresponding to the first reference distance in the first position in the sorted second set, and $y_{m_1}$ represents the ordinate value of the position of the grid corresponding to the first reference distance in the first position in the sorted second set; $x_{m_n}$ represents an abscissa value of the position of the grid corresponding to the first reference distance in the n-th position in the sorted second set, and $y_{m_n}$ represents an ordinate value of the position of the grid corresponding to the first reference distance in the n-th position in the sorted second set; $L_{i,t,m_1}$ represents the first reference distance in the first position in the sorted second set, a subscript i corresponds to an index of the base station, and t represents a current time; and $L_{i,t,m_n}$ represents the n-th first reference distance in the sorted second set.

In an embodiment, when each first reference distance in the sorted second set is longer than the second reference distance corresponding to the grid corresponding to the first reference distance, determining the current position of the UE by determining the positional coordinates of the grid corresponding to the first reference distance in the first position in the sorted set as the current position of the UE.

An example is described below.

Suppose the quantity K of first reference distances, shorter than or equal to the reference distance corresponding to the base station, in the first set is 4, and the first reference distances, shorter than or equal to the reference distance corresponding to the base station, in the first set are represented respectively as $L_{i,t,1}, L_{i,t,4}, L_{i,t,5}, L_{i,t,13}$, then the second set may be represented as $\{L_{i,t,1}, L_{i,t,4}, L_{i,t,5}, L_{i,t,13}\}$. The elements (i.e., the first reference distances) in the second set are sorted in an ascending order. Suppose the sorted second set is represented as $\{L_{i,t,1}, L_{i,t,5}, L_{i,t,13}, L_{i,t,4}\}$, then the first reference distance in the first position in the sorted second set is $L_{i,t,1}$, the first reference distance in the second position in the sorted second set is $L_{i,t,5}$, the first reference distance in the third position in the sorted second set is $L_{i,t,13}$, and the fourth first reference distance in the fourth position in the sorted second set is $L_{i,t,4}$.

Firstly it is determined whether the first reference distance in the first position, $L_{i,t,1}$, in the sorted second set is shorter than or equal to the second reference distance corresponding to the grid 1 corresponding to $L_{i,t,1}$, and if $L_{i,t,1}$ is shorter than or equal to the second reference distance corresponding to the grid 1, then the positional coordinates of the grid 1 is determined as the current position of the UE.

If the first reference distance in the first position, $L_{i,t,1}$, in the sorted second set is longer than the second reference distance corresponding to the grid 1 corresponding to $L_{i,t,1}$, it is determined whether the first reference distance in the second position, $L_{i,t,5}$, in the sorted second set is shorter than or equal to the second reference distance corresponding to the grid 5 corresponding to $L_{i,t,5}$, and if $L_{i,t,5}$ is shorter than or equal to the second reference distance corresponding to the grid 5, then the abscissa value x and the ordinate value y of the current position of the UE are calculated in the following equations [3] and [4]:

$$x = x_{i,1} * \frac{L_{i,t,1}}{L_{i,t,1} + L_{i,t,5}} + x_{i,5} * \frac{L_{i,t,5}}{L_{i,t,1} + L_{i,t,5}}, \text{ and} \quad [3]$$

$$y = y_{i,1} * \frac{L_{i,t,1}}{L_{i,t,1} + L_{i,t,5}} + y_{i,5} * \frac{L_{i,t,5}}{L_{i,t,1} + L_{i,t,5}}. \quad [4]$$

$x_{i,1}$ represents the abscissa value of the position of the grid 1 among the grids corresponding to the coverage area of the base station i, and $x_{i,5}$ represents the abscissa value of the position of the grid 5 among the grids corresponding to the coverage area of the base station i; $y_{i,1}$ represents the ordinate value of the position of the grid 1 among the grids corresponding to the coverage area of the base station i, and $y_{i,5}$ represents the ordinate value of the position of the grid 5 among the grids corresponding to the coverage area of the base station i; and $L_{i,t,1}$ represents the first reference distance corresponding to the grid 1 among the grids corresponding to the coverage area of the base station i at time t, and $L_{i,t,5}$ represents the first reference distance corresponding to the grid 5 among the grids corresponding to the coverage area of the base station i at time t.

If $L_{i,t,5}$ is longer than the second reference distance corresponding to the grid 5, it is determined whether the first reference distance in the third position, $L_{i,t,13}$, in the sorted second set is shorter than or equal to the second reference distance corresponding to the grid 13 corresponding to $L_{i,t,13}$, and if $L_{i,t,13}$ shorter than or equal to the second reference distance corresponding to the grid 13, then the abscissa value x and the ordinate value y of the current position of the UE are calculated in the following equations [5] and [6]:

$$x = x_{i,1} * \frac{L_{i,t,1}}{L_{i,t,1} + L_{i,t,5} + L_{i,t,13}} + \quad [5]$$

$$x_{i,5} * \frac{L_{i,t,5}}{L_{i,t,1} + L_{i,t,5} + L_{i,t,13}} + x_{i,13} * \frac{L_{i,t,13}}{L_{i,t,1} + L_{i,t,5} + L_{i,t,13}}, \text{ and}$$

$$y = y_{i,1} * \frac{L_{i,t,1}}{L_{i,t,1} + L_{i,t,5}x_{i,5} + L_{i,t,13}} + \quad [6]$$

$$y_{i,5} * \frac{L_{i,t,5}}{L_{i,t,1} + L_{i,t,5} + L_{i,t,13}} + y_{i,13} * \frac{L_{i,t,13}}{L_{i,t,1} + L_{i,t,5} + L_{i,t,13}}.$$

$x_{i,13}$ represents the abscissa value of the position of the grid 13 among the grids corresponding to the coverage area of the base station i; $y_{i,13}$ represents the ordinate value of the position of the grid 13 among the grids corresponding to the coverage area of the base station i; and $L_{i,t,13}$ represents the first reference distance corresponding to the grid 13 among the grids corresponding to the coverage area of the base station i at time t.

If $L_{i,t,13}$ is longer than the second reference distance corresponding to the grid 13, it is determined whether the first reference distance in the fourth position, $L_{i,t,4}$, in the sorted second set is shorter than or equal to the second reference distance corresponding to the grid 4 corresponding to $L_{i,t,4}$, and if $L_{i,t,4}$ is shorter than or equal to the second reference distance corresponding to the grid 4, then the abscissa value x and the ordinate value y of the current position of the UE are calculated in the following equations [7] and [8]:

$$x = x_{i,1} * \frac{L_{i,t,1}}{L_{i,t,1} + L_{i,t,5} + L_{i,t,13} + L_{i,t,4}} + \quad [7]$$

$$x_{i,5} * \frac{L_{i,t,5}}{L_{i,t,1} + L_{i,t,5} + L_{i,t,13} + L_{i,t,4}} +$$

$$x_{i,13} * \frac{L_{i,t,13}}{L_{i,t,1} + L_{i,t,5} + L_{i,t,13} + L_{i,t,4}} +$$

$$x_{i,4} * \frac{L_{i,t,4}}{L_{i,t,1} + L_{i,t,5} + L_{i,t,13} + L_{i,t,4}}, \text{ and}$$

$$y = y_{i,1} * \frac{L_{i,t,1}}{L_{i,t,1} + L_{i,t,5} + L_{i,t,13} + L_{i,t,4}} + \quad [8]$$

$$y_{i,5} * \frac{L_{i,t,5}}{L_{i,t,1} + L_{i,t,5} + L_{i,t,13} + L_{i,t,4}} +$$

$$y_{i,13} * \frac{L_{i,t,13}}{L_{i,t,1} + L_{i,t,5} + L_{i,t,13} + L_{i,t,4}} +$$

$$y_{i,4} * \frac{L_{i,t,4}}{L_{i,t,1} + L_{i,t,5} + L_{i,t,13} + L_{i,t,4}}.$$

$x_{i,4}$ represents the abscissa value of the position of the grid 4 among the grids corresponding to the coverage area of the base station i; $y_{i,4}$ represents the ordinate value of the position of the grid 4 among the grids corresponding to the coverage area of the base station i; and $L_{i,t,4}$ represents the first reference distance corresponding to the grid 4 among the grids corresponding to the coverage area of the base station i at time t.

If $L_{i,t,4}$ is longer than the second reference distance corresponding to the grid 4; the positional coordinates of the grid 1 corresponding to the first reference distance in the first position, $L_{i,t,1}$, in the sorted second set is determined as the current position of the UE.

As can be seen from the description above; the locating method according to the embodiments of the disclosure can satisfy precision or confidence requirements of recognition in different grids, thereby improving the precision of locating. The locating method according to the embodiment of the disclosure is applicable to indoor locating. Of course, the locating method is also applicable to outdoor locating.

Figure 2:
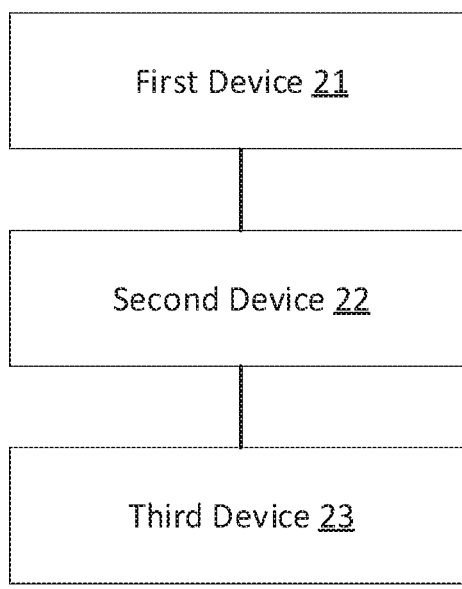
FIG. 2 is a schematic structural diagram of a locating apparatus according to an embodiment of the disclosure.

In correspondence to the locating method above, referring to FIG. 2, an embodiment of the disclosure provides a locating apparatus. The locating apparatus includes a first device 21, a second device 22 and a third device 23.

The first device 21 is configured to: obtain an electrical signal vector of a current position of a UE, and determine a base station currently serving the UE.

The second device 22 is configured to determine grids corresponding to a coverage area of the base station.

The third device 23 is configured to determine the current position of the UE according to distances between the electrical signal vector of the current position of the UE and a preset electrical signal vector of each of the grids, and according to a preset reference distance corresponding to the base station.

For example, the apparatus can be a locating server.

In an embodiment; the third device 23 is further configured to: for each of the grids, determine the distance between the electrical signal vector of the current position of the UE and the preset electrical signal vector of the grid as a first reference distance corresponding to the grid; and determine the current position of the UE according to first reference distances corresponding to each of the grids and the preset reference distance corresponding to the base station.

In an embodiment, the third device 23 is further configured to preset the reference distance corresponding to the base station, and when the third device presets the reference distance corresponding to the base station, the third device 23 is further configured to: determine distances between electrical signal vectors of adjacent grids corresponding to the coverage area of the base station according to the pre-obtained electrical signal vectors of the respective grids corresponding to the coverage area of the base station; for each of the grids corresponding to the coverage area of the base station, select a largest distance of the determined distances between the electrical signal vectors of respective grids adjacent to the grid and the electrical signal vector of the grid, and determine the largest distance as a second reference distance corresponding to the grid; and select a largest one of the second reference distances corresponding to the respective grids corresponding to the coverage area of the base station, and determine the largest second reference distance as the reference distance corresponding to the base station.

In an embodiment, when the third device 23 determines the current position of the UE according to the first reference distances corresponding to each of the grids and the preset reference distance corresponding to the base station, the third device 23 is further configured to: form a first set of the first reference distances corresponding to the respective grids; determine in the first set a quantity K of first reference distances shorter than or equal to the reference distance corresponding to the base station; and when K is 0, determine positional coordinates of a grid corresponding to a shortest first reference distance in the first set as the current position of the UE; or when K is not 0, form a second set of the first reference distances shorter than or equal to the reference distance corresponding to the base station in the first set and determining the current position of the UE according to the second set.

In an embodiment, when the third device determines the current position of the UE according to the second set, the third device is further configured to: sort all of the first reference distances in the second set in an ascending order; and when a first reference distance in a first position after sorting is shorter than or equal to the second reference distance corresponding to the grid corresponding to the first reference distance in the first position, determine positional coordinates of the grid corresponding to the first reference distance in the first position as the current position of the UE; or, when the first reference distance in the first position after sorting is longer than the second reference distance corresponding to the grid corresponding to the first reference distance in the first position, determine in sequence whether a first reference distance in a next position in the sorted second set is shorter than or equal to the second reference distance corresponding to the grid corresponding to the first reference distance in the next position, and when a first reference distance in an n-th position in the sorted second set is shorter than or equal to the second reference distance corresponding to the grid corresponding to the first reference distance in the n-th position, determine current positional coordinates of the UE by weighting positional coordinates of the grids corresponding to the first reference distances from the first position to the n-th position according to the first reference distances from the first position to the n-th position; and determine the current positional coordinates of the UE as the current position of the UE, where n is a positive integer more than or equal to 2.

In an embodiment, when the third device determines the current positional coordinates of the UE by weighting the positional coordinates of the grids corresponding to the first reference distances from the first position to the n-th position according to the first reference distances from the first position to the n-th position, the third device is further configured to: determine an abscissa value x and an ordinate value y of the current position of the UE according to the positional coordinates of the grids corresponding to the first reference distances from the first position to the n-th position, and according to the first reference distances from the first position to the n-th position, by using equations of:

$$x = x_{m_1} * \frac{L_{i,t,m_1}}{L_{i,t,m_1} + L + L_{i,t,m_n}} + L \; x_{m_n} * \frac{L_{i,t,m_n}}{L_{i,t,m_1} + L + L_{i,t,m_n}}, \text{ and}$$

$$y = y_{m_1} * \frac{L_{i,t,m_1}}{L_{i,t,m_1} + L + L_{i,t,m_n}} + L \; y_{m_n} * \frac{L_{i,t,m_n}}{L_{i,t,m_1} + L + L_{i,t,m_n}}.$$

$x_{m_1}$ represents an abscissa value of the position of the grid corresponding to the first reference distance in the first position in the sorted second set, and $y_{m_1}$ represents the ordinate value of the position of the grid corresponding to the first reference distance in the first position in the sorted second set; $x_{m_n}$ represents an abscissa value of the position of the grid corresponding to the first reference distance in the n-th position in the sorted second set, and $y_{m_n}$ represents an ordinate value of the position of the grid corresponding to the first reference distance in the n-th position in the sorted second set; $L_{i,t,m_1}$ represents the first reference distance in the first position in the sorted second set, a subscript i corresponds to an index of the base station, and t represents a current time; and $L_{i,t,m_n}$ represents the n-th first reference distance in the sorted second set.

In an embodiment, the third device 23 is further configured to: when each first reference distance in the sorted second set is longer than the second reference distance corresponding to the grid corresponding to the first reference distance, determine the current position of the UE by determining the positional coordinates of the grid corresponding to the first reference distance in the first position in the sorted set as the current position of the UE.

In the embodiments of the disclosure, the respective functional devices above can be implemented by physical devices such as specific hardware processors.

Embodiments of the disclosure can be embodied as a method, a system or a computer program product. Therefore the disclosure can be embodied in the form of an all-hardware embodiment, an all-software embodiment or an embodiment of software and hardware in combination. Furthermore the disclosure can be embodied in the form of a computer program product embodied in one or more computer useable storage mediums (including but not limited to a disk memory, an optical memory, etc.) in which computer useable program codes are contained.

The disclosure has been described in a flow chart and/or a block diagram of the method, the device (system) and the computer program product according to the embodiments of the disclosure. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device to perform the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture to perform the functions specified in the flow(s) of the flow chart and/or the block(s) of the block diagram.

These computer program instructions can also be loaded onto the computer or the other programmable data processing device so that a series of operational operations are performed on the computer or the other programmable data processing device to create a computer implemented process so that the instructions executed on the computer or the other programmable device provide operations for performing the functions specified in the flow(s) of the flow chart and/or the block(s) of the block diagram.

The invention claimed is:

1. A locating method, comprising:
obtaining an electrical signal vector of a current position of a User Equipment (UE), and determining a base station currently serving the UE;
determining a plurality of grids corresponding to a coverage area of the base station; and
determining the current position of the UE according to distances between the electrical signal vector of the current position of the UE and a preset electrical signal vector of each of the grids, and according to a preset reference distance corresponding to the base station, wherein determining the current position of the UE according to the distances between the electrical signal vector of the current position of the UE and the preset electrical signal vector of each of the grids, and according to the preset reference distance corresponding to the base station, comprises:
for each of the grids, determining the distance between the electrical signal vector of the current position of the UE and the preset electrical signal vector of the grid as a first reference distance corresponding to the grid; and
determining the current position of the UE according to first reference distances corresponding to each of the grids and the preset reference distance corresponding to the base station;
wherein the reference distance corresponding to the base station is determined by:
determining distances between electrical signal vectors of adjacent grids corresponding to the coverage area of the base station according to the pre-obtained electrical signal vectors of the respective grids corresponding to the coverage area of the base station;
for each of the grids corresponding to the coverage area of the base station, selecting a largest distance of the determined distances between the electrical signal vectors of respective grids adjacent to the grid and the electrical signal vector of the grid, and determining the largest distance as a second reference distance corresponding to the grid; and
selecting a largest one of the second reference distances corresponding to the respective grids corresponding to the coverage area of the base station, and determining the largest second reference distance as the reference distance corresponding to the base station.

2. The method according to claim 1, wherein determining the current position of the UE according to the first reference distances corresponding to each of the grids and the preset reference distance corresponding to the base station comprises:

forming a first set of the first reference distances corresponding to the respective grids;
determining in the first set a quantity K of first reference distances shorter than or equal to the reference distance corresponding to the base station; and
when K is 0, determining positional coordinates of a grid corresponding to a shortest first reference distance in the first set as the current position of the UE; or
when K is not 0, forming a second set of the first reference distances shorter than or equal to the reference distance corresponding to the base station in the first set and determining the current position of the UE according to the second set.

3. The method according to claim 2, wherein determining the current position of the UE according to the second set comprises:
sorting all of the first reference distances in the second set in an ascending order; and
when a first reference distance in a first position after sorting is shorter than or equal to the second reference distance corresponding to the grid corresponding to the first reference distance in the first position, determining positional coordinates of the grid corresponding to the first reference distance in the first position as the current position of the UE; or
when the first reference distance in the first position after sorting is longer than the second reference distance corresponding to the grid corresponding to the first reference distance in the first position, determining in sequence whether a first reference distance in a next position in the sorted second set is shorter than or equal to the second reference distance corresponding to the grid corresponding to the first reference distance in the next position, and when a first reference distance in an n-th position in the sorted second set is shorter than or equal to the second reference distance corresponding to the grid corresponding to the first reference distance in the n-th position, determining current positional coordinates of the UE by weighting positional coordinates of the grids corresponding to the first reference distances from the first position to the n-th position according to the first reference distances from the first position to the n-th position, and determining the current positional coordinates of the UE as the current position of the UE, wherein n is a positive integer more than or equal to 2.

4. The method according to claim 3, wherein determining the current positional coordinates of the UE by weighting the positional coordinates of the grids corresponding to the first reference distances from the first position to the n-th position according to the first reference distances from the first position to the n-th position comprises:
determining an abscissa value x and an ordinate value y of the current position of the UE according to the positional coordinates of the grids corresponding to the first reference distances from the first position to the n-th position, and according to the first reference distances from the first position to the n-th position, by using equations of:

$$x = x_{m_1} * \frac{L_{i,t,m_1}}{L_{i,t,m_1} + L + L_{i,t,m_n}} + L\, x_{m_n} * \frac{L_{i,t,m_n}}{L_{i,t,m_1} + L + L_{i,t,m_n}}, \text{ and}$$

-continued $$y = y_{m_1} * \frac{L_{i,t,m_1}}{L_{i,t,m_1} + L + L_{i,t,m_n}} + L\ y_{m_n} * \frac{L_{i,t,m_n}}{L_{i,t,m_1} + L + L_{i,t,m_n}},$$

wherein $x_{m_1}$ represents an abscissa value of the position of the grid corresponding to the first reference distance in the first position in the sorted second set, and $y_{m_1}$ represents the ordinate value of the position of the grid corresponding to the first reference distance in the first position in the sorted second set; $x_{m_n}$ represents an abscissa value of the position of the grid corresponding to the first reference distance in the n-th position in the sorted second set, and $y_{m_n}$ represents an ordinate value of the position of the grid corresponding to the first reference distance in the n-th position in the sorted second set; $L_{i,t,m_1}$ represents the first reference distance in the first position in the sorted second set, a subscript i corresponds to an index of the base station, and t represents a current time; and $L_{i,t,m_n}$ represents the n-th first reference distance in the sorted second set.

5. The method according to claim 3, further comprising:
when each first reference distance in the sorted second set is longer than the second reference distance corresponding to the grid corresponding to the first reference distance, determining the current position of the UE by determining the positional coordinates of the grid corresponding to the first reference distance in the first position in the sorted set as the current position of the UE.

6. A locating apparatus, comprising:
a memory storing one or more instructions; and
a processor configured to execute the one or more instructions to:
obtain an electrical signal vector of a current position of a User Equipment (UE);
determine a base station currently serving the UE;
determine a plurality of grids corresponding to a coverage area of the base station; and
determine the current position of the UE according to distances between the electrical signal vector of the current position of the UE and a preset electrical signal vector of each of the grids, and according to a preset reference distance corresponding to the base station;
wherein the processor is further configured to execute the one or more instructions to:
preset the reference distance corresponding to the base station by:
determining distances between electrical signal vectors of adjacent grids corresponding to the coverage area of the base station according to the pre-obtained electrical signal vectors of the respective grids corresponding to the coverage area of the base station;
for each of the grids corresponding to the coverage area of the base station, selecting a largest distance of the determined distances between the electrical signal vectors of respective grids adjacent to the grid and the electrical signal vector of the grid, and determining the largest distance as a second reference distance corresponding to the grid;
selecting a largest one of the second reference distances corresponding to the respective grids corresponding to the coverage area of the base station;
determining the largest second reference distance as the reference distance corresponding to the base station; and
for each of the grids, determine the distance between the electrical signal vector of the current position of the UE and the preset electrical signal vector of the grid as a first reference distance corresponding to the grid; and
determine the current position of the UE according to first reference distances corresponding to each of the grids and the preset reference distance corresponding to the base station.

7. The apparatus according to claim 6, wherein the processor is further configured to execute the one or more instructions to:
form a first set of the first reference distances corresponding to the respective grids;
determine in the first set a quantity K of first reference distances shorter than or equal to the reference distance corresponding to the base station; and
when K is 0, determine positional coordinates of a grid corresponding to a shortest first reference distance in the first set as the current position of the UE; or
when K is not 0, form a second set of the first reference distances shorter than or equal to the reference distance corresponding to the base station in the first set and determining the current position of the UE according to the second set.

8. The apparatus according to claim 7, wherein the processor is further configured to execute the one or more instructions to:
sort all of the first reference distances in the second set in an ascending order; and
when a first reference distance in a first position after sorting is shorter than or equal to the second reference distance corresponding to the grid corresponding to the first reference distance in the first position, determine positional coordinates of the grid corresponding to the first reference distance in the first position as the current position of the UE; or
when the first reference distance in the first position after sorting is longer than the second reference distance corresponding to the grid corresponding to the first reference distance in the first position, determine in sequence whether a first reference distance in a next position in the sorted second set is shorter than or equal to the second reference distance corresponding to the grid corresponding to the first reference distance in the next position, and when a first reference distance in an n-th position in the sorted second set is shorter than or equal to the second reference distance corresponding to the grid corresponding to the first reference distance in the n-th position, determine current positional coordinates of the UE by weighting positional coordinates of the grids corresponding to the first reference distances from the first position to the n-th position according to the first reference distances from the first position to the n-th position, and determine the current positional coordinates of the UE as the current position of the UE, wherein n is a positive integer more than or equal to 2.

9. The apparatus according to claim 8, wherein the processor is further configured to execute the one or more instructions to:
determine an abscissa value x and an ordinate value y of the current position of the UE according to the positional coordinates of the grids corresponding to the first reference distances from the first position to the n-th position, and according to the first reference distances from the first position to the n-th position, by using equations of:

$$x = x_{m_1} * \frac{L_{i,t,m_1}}{L_{i,t,m_1} + L + L_{i,t,m_n}} + L\, x_{m_n} * \frac{L_{i,t,m_n}}{L_{i,t,m_1} + L + L_{i,t,m_n}}, \text{ and}$$

$$y = y_{m_1} * \frac{L_{i,t,m_1}}{L_{i,t,m_1} + L + L_{i,t,m_n}} + L\, y_{m_n} * \frac{L_{i,t,m_n}}{L_{i,t,m_1} + L + L_{i,t,m_n}},$$

wherein $x_{m_1}$ represents an abscissa value of the position of the grid corresponding to the first reference distance in the first position in the sorted second set, and $y_{m_1}$ represents the ordinate value of the position of the grid corresponding to the first reference distance in the first position in the sorted second set; $x_{m_n}$ represents an abscissa value of the position of the grid corresponding to the first reference distance in the n-th position in the sorted second set, and $y_{m_n}$ represents an ordinate value of the position of the grid corresponding to the first reference distance in the n-th position in the sorted second set; $L_{i,t,m_1}$ represents the first reference distance in the first position in the sorted second set, a subscript i corresponds to an index of the base station, and t represents a current time; and $L_{i,t,m_n}$ represents the n-th first reference distance in the sorted second set.

10. The apparatus according to claim 8, wherein the processor is further configured to execute the one or more instructions to:

when each first reference distance in the sorted second set is longer than the second reference distance corresponding to the grid corresponding to the first reference distance, determine the current position of the UE by determining the positional coordinates of the grid corresponding to the first reference distance in the first position in the sorted set as the current position of the UE.

* * * * *